(12) United States Patent
Ehrlich et al.

(10) Patent No.: US 9,914,389 B2
(45) Date of Patent: Mar. 13, 2018

(54) THEFT DETERRENT VEHICLE LAMP MOUNT SYSTEM

(71) Applicant: Wabash National, L.P., Lafayette, IN (US)

(72) Inventors: Rodney P. Ehrlich, Oxford, IN (US); Jeffrie Scott Bauer, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 15/190,648

(22) Filed: Jun. 23, 2016

(65) Prior Publication Data

US 2016/0375822 A1    Dec. 29, 2016

Related U.S. Application Data

(60) Provisional application No. 62/184,662, filed on Jun. 25, 2015.

(51) Int. Cl.

| | |
|---|---|
| *B60Q 1/00* | (2006.01) |
| *B60Q 3/00* | (2017.01) |
| *B60Q 1/26* | (2006.01) |
| *B60R 25/00* | (2013.01) |
| *F21S 8/10* | (2006.01) |
| *F21V 15/00* | (2015.01) |
| *F21Y 115/10* | (2016.01) |

(52) U.S. Cl.
CPC ........... B60Q 1/2623 (2013.01); B60Q 1/263 (2013.01); B60R 25/00 (2013.01); F21S 48/212 (2013.01); F21S 48/215 (2013.01); F21S 48/33 (2013.01); F21V 15/005 (2013.01); *F21Y 2115/10* (2016.08)

(58) Field of Classification Search
CPC ... B06Q 1/26; B06Q 1/30; B06Q 1/00; B06Q 3/00
USPC ................................ 362/485, 540, 549, 548
See application file for complete search history.

(56) References Cited

U.S. PATENT DOCUMENTS

| | | |
|---|---|---|
| 3,806,721 A | 4/1974 | Murphy, Jr. |
| 6,332,697 B2 | 12/2001 | Soga et al. |
| 7,819,566 B2 | 10/2010 | Kolstee et al. |
| 8,511,874 B2 | 8/2013 | Nakada |
| 2012/0250340 A1* | 10/2012 | Nichols ................. F21V 15/005 362/485 |
| 2014/0321134 A1* | 10/2014 | Bauer ...................... B60Q 1/32 362/485 |

* cited by examiner

*Primary Examiner* — Daniel Hess
(74) *Attorney, Agent, or Firm* — Quarles & Brady LLP

(57) ABSTRACT

A theft-deterrent lamp system for use with a vehicle includes a grommet and a cover. The lamp system is configured to mount with the vehicle and receive a lamp to couple the lamp with the vehicle. The lamp system is arranged to block the lamp from being separated from the vehicle without removing a portion of the lamp system from the vehicle.

20 Claims, 6 Drawing Sheets

THEFT DETERRENT VEHICLE LAMP MOUNT SYSTEM

CROSS REFERENCE TO RELATED APPLICATIONS

This application claims priority to and the benefit of U.S. Provisional Patent Application No. 62/184,662, filed 25 Jun. 2015, the disclosure of which is now expressly incorporated herein by reference.

FIELD OF THE DISCLOSURE

The present disclosure relates generally to vehicle lamp mount systems, and more specifically to a grommet and enclosure for mounting a lamp on a vehicle.

BACKGROUND

Typical vehicles and towable structures such as, for example, semi-trailers, van-type trailers, flatbed and platform type trailers, container chassis, and cargo containers, include lamps. As an example, indicator lamps may be used for signaling to other drivers that the operator intends to turn or stop the vehicle. These lamps are designed to be received in holes formed in an external surface of the vehicle's body and may be secured to the vehicle with mounting plates and fasteners.

Some lamps are designed to deter or prevent theft by using blind fasteners (such as a pull rivet, for example) that are received in holes provided in the external surface of a vehicle's body. However, tools may be needed to remove and change the lamps when they wear out or malfunction for example. Further, in some instances, the blind fasteners are destroyed when removing or replacing the lamp from the vehicle.

Accordingly, there remains a need for further contributions in this area of technology, including contributions that reduce complexity and cost.

SUMMARY

The present disclosure may comprise one or more of the following features recited in the attached claims and combinations thereof, and/or one or more of the following features and combination thereof.

In one aspect of the disclosure, an illustrative lamp-mount grommet and cover is disclosed. Other embodiments include apparatuses, systems, devices, hardware, methods, and combinations for attaching and securing lamps to trailers and vehicles. Further embodiments, forms, features, aspects, benefits, and advantages of the present application shall become apparent from the description and figures provided herewith.

A vehicle assembly for deterring theft of a vehicle lamp may include a sill, a lamp-mount grommet, and a theft-deterrent cover. The sill may have an upper support wall, a generally vertically extending fantail having an upper end coupled to the upper support wall and a lower end spaced apart from the upper end, and a base plate coupled to the lower end of the fantail. The upper support wall, the fantail, and the base plate may cooperate to define a forwardly opening lamp cavity. The fantail may be formed to include a grommet-receiving aperture that extends through the fantail. The lamp-mount grommet may have a body that extends through the grommet-receiving aperture formed in the fantail to couple the lamp-mount grommet with the sill and a lamp holder that extends away from the body into the lamp cavity. The lamp holder may be arranged to support a lamp in the forwardly opening lamp cavity. The theft-deterrent cover may be coupled to the sill to close the forwardly opening lamp cavity.

In some embodiments, the theft-deterrent cover may include a generally horizontal sill mount coupled to the base plate and an access panel that extends upwardly away from the sill mount to close the forwardly opening lamp cavity. The upper support wall may include a top band coupled to the fantail and a retainer flange spaced apart from the fantail and coupled to the top band. The retainer flange may extend downwardly away from the top band toward the base plate and may overlap a portion of the access panel to block forward movement of the access panel.

In some embodiments, the access panel is formed to include an access aperture that extends through the access panel to limit access into the lamp cavity. The access aperture may be aligned with the grommet-receiving aperture.

In some embodiments, the theft-deterrent cover may further include a splash guard coupled to the access panel. The splash guard may be arranged to cover the access aperture to selectively block access into the lamp cavity.

In some embodiments, the lamp holder of the lamp-mount grommet is arranged around a central axis of the lamp-mount grommet. The lamp holder includes a radial outer wall coupled to the body, a radial inner wall located radially between the radial outer wall and the central axis to define a lamp-holder recess between the radial inner wall and the radial outer wall, and a flexible joint that extends radially between and interconnects the radial outer and inner walls. The flexible joint may be arranged to pivot the radial inner wall radially outwardly toward the radial outer wall in response to an axially rearward force being applied to the radial inner wall.

In some embodiments, the radial inner wall and the radial outer wall may cooperate to define an angle therebetween. The angle may be between about 10 degrees and about 15 degrees.

According to another aspect of the present disclosure, a vehicle assembly may include a cover. The cover may include a sill mount arranged to extend generally horizontal relative to ground underlying the sill mount and an access panel coupled to the sill mount and arranged to extend upwardly away from the sill mount. The sill mount may be formed to include a fastener aperture that extends through the sill mount. The fastener aperture may be adapted to receive a fastener to couple the sill mount to a vehicle. The access panel may be formed to include an access aperture that extends through the access panel. The access aperture may be sized to receive a hand of a user of the theft-deterrent cover assembly.

In some embodiments, the access aperture may have a diameter between about four inches and about six inches. In some embodiments, the cover may further include a top segment spaced apart from the sill mount and coupled to the access panel. The top segment and the sill mount may be generally parallel.

In some embodiments, the vehicle assembly may further include a vehicle sill that cooperates with the cover to define a lamp cavity. The sill may be formed to include a grommet-receiving aperture that extends through the sill. The access aperture may be aligned with the grommet-receiving aperture.

In some embodiments, the sill may include an upper support wall, a fantail having an upper end coupled to the upper support wall and a lower end spaced apart from the upper end, and a base plate coupled to the lower end of the fantail. The upper support wall, the fantail, the base plate, and the cover may cooperate to define the lamp cavity. A portion of the upper support wall may extend downwardly and overlap a portion of the access panel to block forward movement of the access panel.

In some embodiments, the cover may further include a splash guard coupled to the access panel. The splash guard may be arranged to cover the access aperture to selectively block access to the lamp cavity.

According to another aspect of the present disclosure, a grommet for mating a lamp with a vehicle may include a body and a lamp holder. The body may be arranged around a central axis of the grommet. The body may include an axially extending annular alignment wall having a front end and a rear end, a mating wall that extends radially outward away from the front end of the alignment wall, and an attachment flange that extends radially outward away from the rear end of the alignment wall. The alignment wall, the mating wall, and the attachment flange may cooperate to define a radially outwardly opening fantail channel that extends around the central axis. The fantail channel may be adapted to receive a portion of a vehicle therein to couple the grommet with the vehicle.

The lamp holder may be coupled with the mating wall. The lamp holder may include a radial outer wall, a radial inner wall, and a flexible joint. The radial outer wall may be coupled to the mating wall and may be arranged to extend axially forward away from the mating wall. The radial inner wall may be located radially between the radial outer wall and the central axis to define a lamp-holder recess between the radial inner wall and the radial outer wall. The flexible joint may extend radially between and interconnect the radial outer and inner walls. The radial inner wall may be arranged to extend from the flexible joint axially rearward toward the mating wall. The flexible joint may be arranged to pivot the radial inner wall radially outward toward the radial outer wall in response to a first axially rearward force being applied to the radial inner wall.

In some embodiments, the radial inner wall may include an attachment end coupled to the flexible joint and a free end spaced apart from the attachment end. The free end may be spaced apart axially from the mating wall to form a gap therebetween. In some embodiments, the free end of the radial inner wall may be formed to include a curved surface that defines a channel that extends axially into the radial inner wall.

In some embodiments, the radial inner wall and the radial outer wall may cooperate to define an angle therebetween. The angle may be between about 10 degrees and about 15 degrees.

In some embodiments, the grommet further includes a return flange coupled to the mating wall. The return flange may be arranged to extend axially forward away from the mating wall and radially outward toward the radial outer wall of the lamp holder. The return flange may be arranged to temporarily deform in response to a second axially rearward force being applied to the return flange.

In some embodiments, the return flange may include an attachment end coupled to the mating wall and a free end spaced apart from the attachment end. The return flange and the mating wall may cooperate to define a radially outwardly opening return-flange recess therebetween. In some embodiments, the body and the lamp holder may form a monolithic component made of an elastic material.

In some embodiments, the mating wall may include a first end coupled with the alignment wall and a second end spaced apart from the first end of the mating wall. The attachment flange may include a first end coupled with the alignment wall and a second end spaced apart from the first end of the attachment flange. The second end of the mating wall may be radially spaced apart from the second end of the attachment flange to locate the second end of the attachment flange radially between the second end of the mating wall and the alignment wall.

These and other features of the present disclosure will become more apparent from the following description of the illustrative embodiments.

BRIEF DESCRIPTION OF THE DRAWINGS

FIG. 6 is a view similar to FIG. 4 showing the indicator lamp spaced apart from the lamp-mount grommet;

FIG. 7 is a view similar to FIG. 6 showing the indicator lamp partially inserted into the lamp-mount grommet and showing that that a rim of the indicator lamp forces a portion of the lamp holder to deform radially outward as the indicator lamp is inserted into the grommet;

FIG. 8 is a view similar to FIG. 7 after the rim of the indicator lamp has cleared the lamp holder and is engaged with the return flange such that the return flange is in a flexed position and showing that the lamp holder returns to its pre-deformed position to block forward movement of the indicator lamp;

FIG. 9 is a view similar to FIG. 8 showing the indicator lamp in a secured position and suggesting that return flange engages the rim of the indicator lamp to block rearward movement of the indicator lamp and to bias the rim toward the lamp holder;

Figure 1:
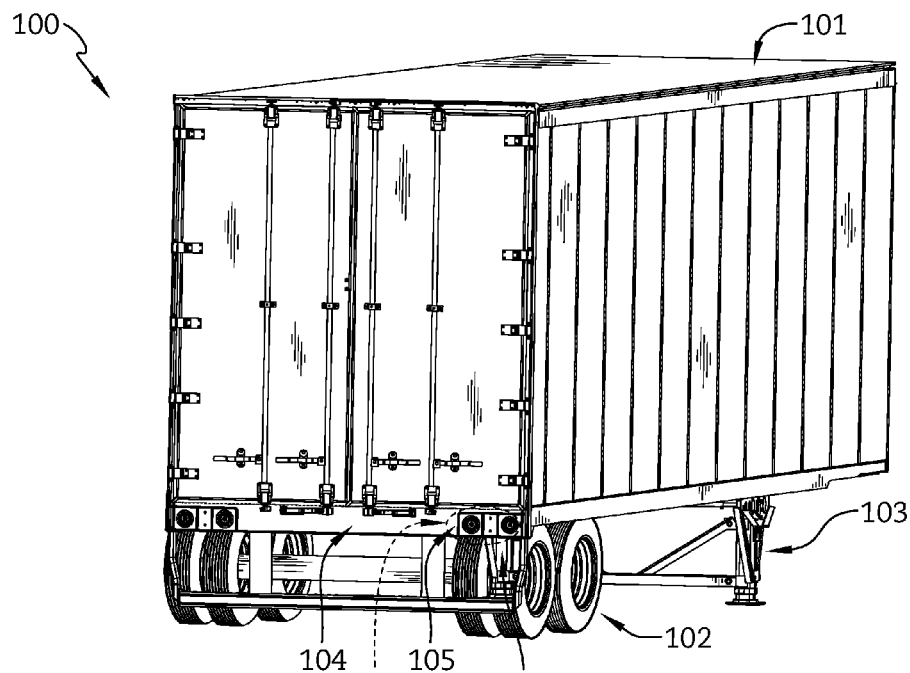
FIG. 1 is a rear perspective view of a semi-trailer having a lamp system employing features of the present disclosure.

Corresponding reference characters indicate corresponding parts throughout the several views. Although the drawings represent embodiments of the present disclosure, the drawings are not necessarily to scale and certain features may be exaggerated in order to better illustrate and explain the present disclosure.

DETAILED DESCRIPTION OF THE DRAWINGS

For the purposes of promoting an understanding of the principles of the disclosure, reference will now be made to a number of illustrative embodiments shown in the attached drawings and specific language will be used to describe the same. While the concepts of this disclosure are described in relation to a lamp system for use in a trailer to a semi-tractor, it will be understood that it is equally applicable to other trailers and vehicles.

An illustrative lamp system 8 in accordance with the present disclosure is coupled to a rear frame assembly 104 of a trailer 100 as shown in FIG. 1. The lamp system 8 includes a lamp assembly 10 as shown in FIGS. 1-12 and a theft-deterrent cover 212 shown in FIGS. 13-15. The lamp assembly 10 includes an indicator lamp 20 and a lamp-mount grommet 12 configured to receive and support the indicator lamp 20 on the trailer 100.

Figure 15:
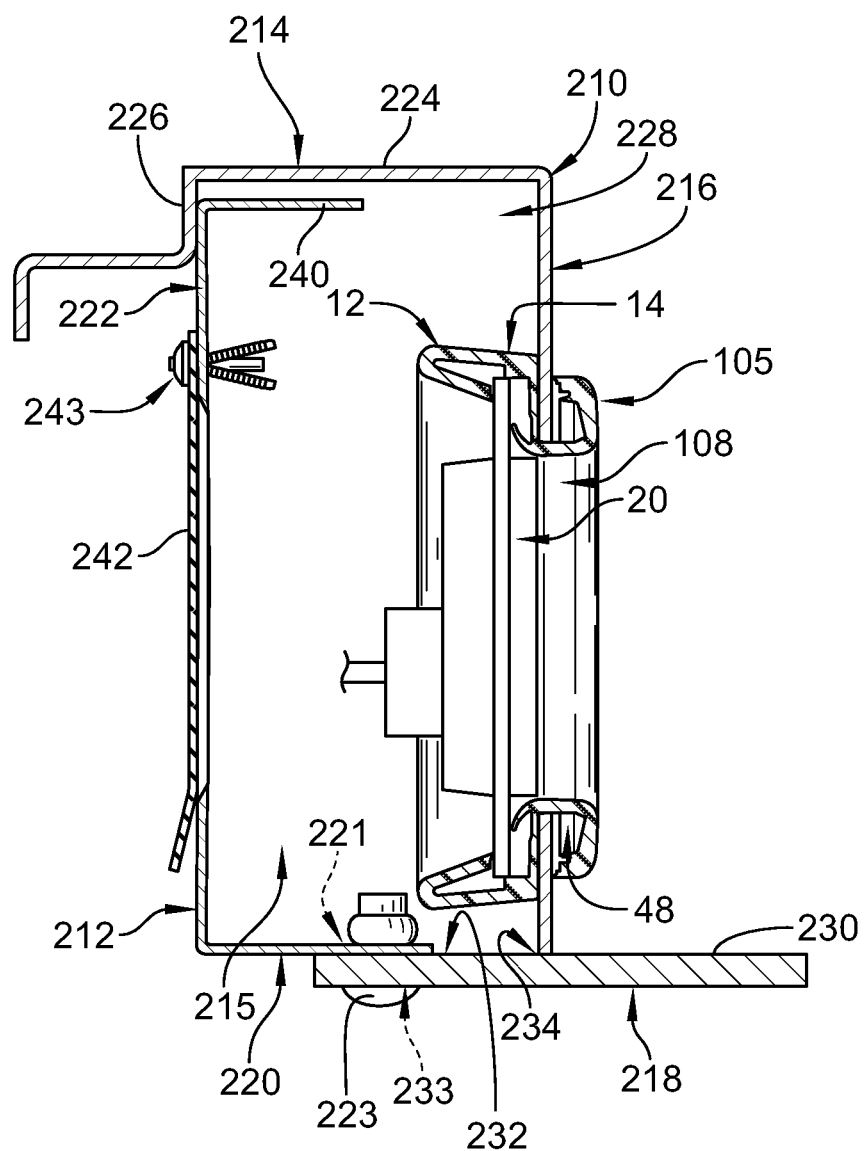
FIG. 15 is a sectional view of the rear frame assembly and the lamp system showing the theft-deterrent plate coupled to the rear frame assembly to block removal of the indicator lamp from the rear frame assembly and further showing that the theft-deterrent plate includes an access panel having an access aperture sized both to allow access to the lamp assembly and to block the lamp assembly from being pulled through the access aperture.

The rear frame assembly 104 and the cover 212 cooperate to define a lamp cavity 215 as shown in FIG. 15. The lamp-mount grommet 12 extends through a grommet-receiving aperture 108 formed in the rear frame assembly 104 to couple the grommet 12 with the trailer 100. The lamp-mount grommet 12 is arranged to support the indicator lamp 20 in the lamp cavity 215. The grommet-receiving aperture 108 is sized to block the lamp 20 from passing through the aperture 108 to block the indicator lamp 20 from escaping the lamp cavity 215 to deter theft.

The theft-deterrent cover 212 is coupled to the rear frame assembly 104 and arranged to allow user access to the lamps 20 while blocking the lamps 20 from escaping the lamp cavity 215 as suggested in FIG. 15. The lamps 20 may be moved in and out of the lamp cavity 215 when the cover 212 is separated from the rear frame assembly 104.

Illustratively, the indicator lamps 20 are configured to detach from the lamp-mount grommets 12 and fall into the lamp cavity 215 defined between the cover 212 and the trailer 100 in response to an external forward force being applied to the indicator lamp 20 as suggested in FIG. 15. A user may reach a hand through an access aperture 238 formed in the theft-deterrent cover 212 to re-mount the lamp 20 in the lamp-mount grommet 12 without removing the cover 212 from the rear frame assembly 104. The aperture 238 is sized to block the lamp 20 from being pulled through the aperture 238 to deter theft of the lamp 20.

The trailer 100 includes a cargo enclosure 101, wheels 102, and the rear frame assembly 104, as shown in FIG. 1. The cargo enclosure 101 is configured to store cargo therein while the trailer 100 is in transit or is stationary. The wheels 102 support the cargo enclosure 101. In some embodiments, a landing gear 103 is coupled to the cargo enclosure 101 to cooperate with the wheels 102 to support the cargo enclosure 101 while the trailer 100 is stationary. The rear frame assembly 104 is coupled to the cargo enclosure 101 at a rear of the trailer.

Each lamp assembly 10 includes the indicator lamp 20 and the lamp-mount grommet 12. The indicator lamps 20 are electrically connected with a truck (not shown), for example, used to tow the trailer 100 to indicate when the trailer 100 is turning, stopping, etc. In the illustrative embodiment, the indicator lamps 20 include one or more LEDs 22 covered by a bezel 24. In the illustrative embodiment, pair of lamp assemblies 10 cooperates to define a signal assembly 105 as shown in FIG. 2.

Figure 3:
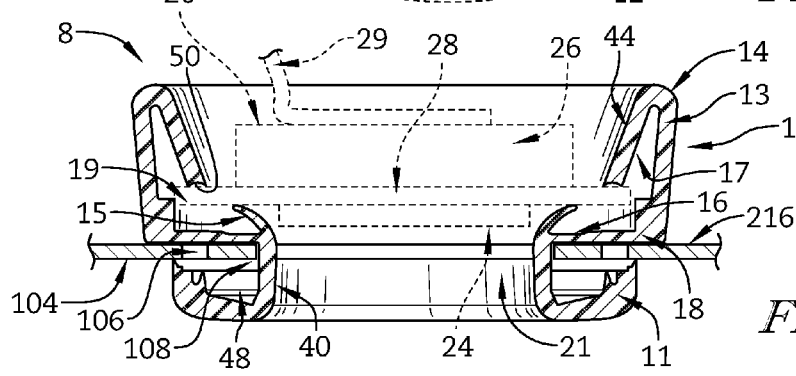
FIG. 3 is a sectional view taken along line 3-3 in FIG. 2 showing one of the lamp-mount grommets mounted to the rear frame assembly of the semi-trailer and the showing that the grommet receives and retains one of the indicator lamps.

The indicator lamp 20 includes a lamp body 26, a rim 28 coupled to the lamp body 26, and wiring 29 as shown in FIG. 3. The lamp body 26 houses the LEDs 22, which are supplied with electricity through the wiring 29. The rim 28 extends radially outward of the lamp body 26. The bezel 24 couples to the lamp body 26 to cover the LEDs 22. An aperture 21 is formed through the lamp-mount grommet 12 to allow light produced by the LEDs 22 to pass through the lamp-mount grommet 12 and the rear frame assembly 104.

Figure 2:
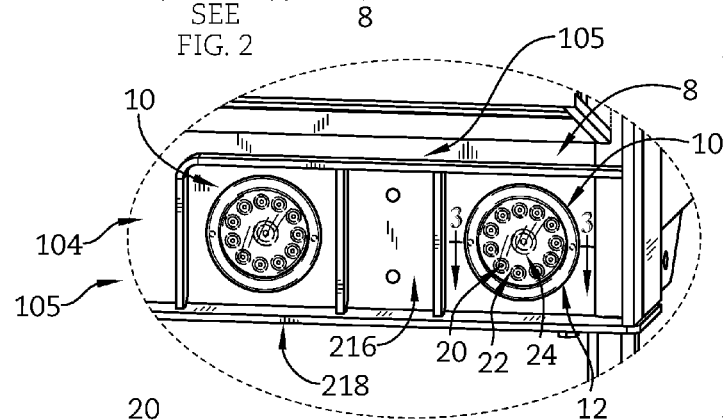
FIG. 2 is a detail view of the semi-trailer of FIG. 1 showing that the lamp system includes a pair of lamp-mount grommets mounted to a rear frame assembly of the semi-trailer to support a pair of indicator lamps and suggesting that removal of the lamps through the rear frame is blocked to deter theft.
Figure 4:
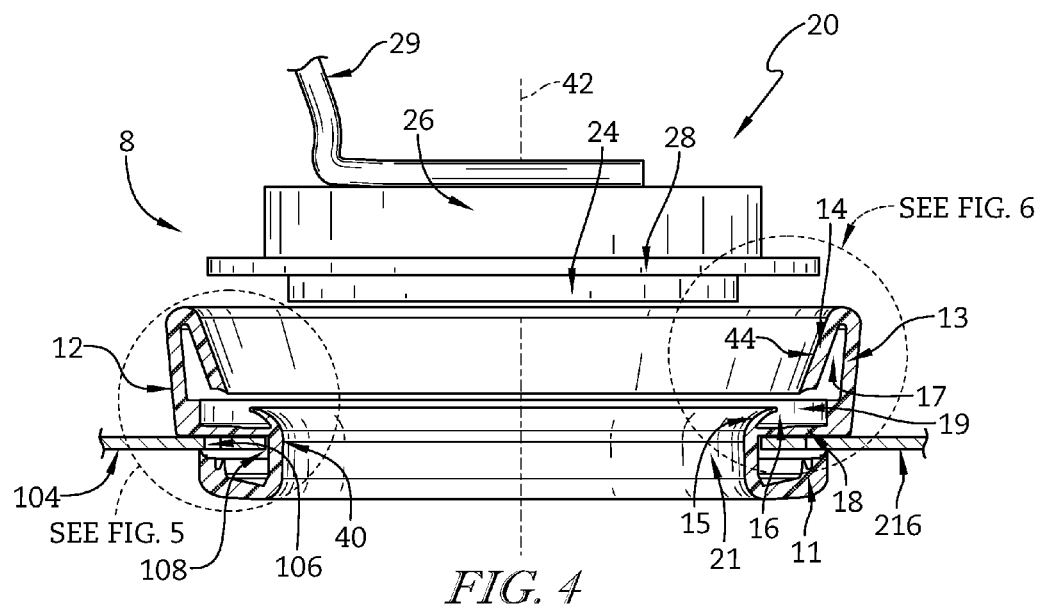
FIG. 4 is a view similar to FIG. 3 showing an indicator lamp that is spaced apart from the lamp-mount grommet and suggesting that the lamp is about to be inserted into the lamp-mount grommet.

The lamp-mount grommet 12 is substantially annular and couples to the rear frame assembly 104 as shown in FIG. 2. The lamp-mount grommet 12 is configured to retain the indicator lamp 20 on the rear frame assembly 104 such that the LEDs 22 face outwards as shown in FIGS. 2 and 3. The lamp-mount grommet 12 has a central axis 42 and includes a body 40 and a lamp holder 14 that extend around the central axis 42 as shown in FIG. 4. In the illustrative embodiment, the lamp-mount grommet 12 further includes a return flange 15.

Figure 5:
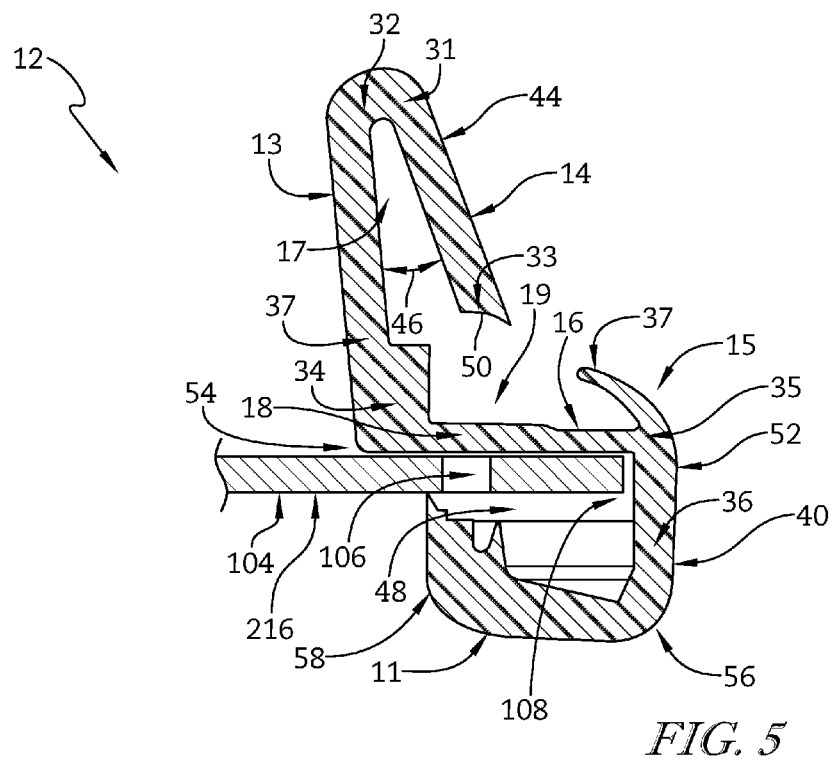
FIG. 5 is a detail view of the lamp-mount grommet of FIG. 4 showing that the lamp mount grommet includes an attachment flange for coupling the lamp-mount grommet to the rear frame assembly, a lamp holder for securing the indicator lamp to the lamp-mount grommet, and a return flange for biasing the indicator lamp toward the lamp holder.

The body 40 of the lamp-mount grommet 12 extends through a grommet-receiving aperture 108 formed through the rear frame assembly 104 as shown in FIGS. 4 and 5. The grommet-receiving aperture 108 is sized to block the lamp 20 from passing through the aperture 108. The body 40 includes an annular alignment wall 36, a mating wall 18, and an attachment flange 11. The alignment wall 36, mating wall 18, and attachment flange 11 cooperate to define a radially outwardly opening fantail channel 48. The fantail channel 48 is adapted to receive a portion of a fantail 216 included in the rear frame assembly 104.

The attachment flange 11 is configured to engage with the rear frame assembly 104 to retain the lamp-mount grommet 12 to the rear frame assembly 104 as shown in FIG. 4. The lamp holder 14 engages the indicator lamp 20 to retain the indicator lamp 20 to the rear frame assembly 104. The return flange 15 biases the indicator lamp 20 toward the lamp holder 14 into a secured position. The lamp-mount grommet 12 is formed from an elastic material (sometimes called a flexible material). In some embodiments, the lamp-mount grommet 12 comprises rubber, for example. In the illustrative embodiment, the body 40, the lamp holder 14, and the return flange 15 are monolithically formed.

The attachment flange 11 extends toward a rear of the trailer 100 while the lamp holder 14 extends toward a front of the trailer 100 as suggested in FIG. 4. The attachment flange 11 is sized to extend around optional fastener holes 106 formed in the rear frame assembly 104 and provides a clean look and aesthetic appeal. The fastener holes 106 may be used to attach other indicator lamps to the rear frame assembly 104 when the lamp-mount grommet 12 is not in use.

The alignment wall 36 includes a forward end and a rear end spaced apart from the forward end as shown in FIG. 4. The alignment wall 36 maintains alignment of the lamp-mount grommet 12 with the grommet-receiving aperture 108 in the rear frame assembly 104. The mating wall 18 is coupled to the forward end of the alignment wall 36 and extends radially outward away from the central axis 42. The attachment flange 11 is coupled to the rear end of the alignment wall 36 and extends radially outward away from the central axis 42. The alignment wall 36 defines an aperture 21 for light from the lamp 20 to pass through the grommet 12.

The mating wall 18 includes a first end 52 coupled with the alignment wall 36 and a second end 54 spaced apart from the first end 52 as shown in FIG. 5. The attachment flange 11 includes a first end 56 coupled with the alignment wall 36 and a second end 58 spaced apart from the first end 56. The mating wall 18 extends further away from the alignment wall 36 than the attachment flange 11 so that the second end 58 of the attachment flange 11 is radially located between the central axis 42 and the second end 54 of the mating wall 18.

The lamp holder 14 includes a radial outer wall 13, a radial inner wall 44, and a flexible joint 37 as shown in FIG. 5. The radial outer wall 13 is coupled to the mating wall 18 and is arranged to extend axially forward away from the mating wall 18. The radial inner wall 44 is radially spaced apart from the radial outer wall 13 to define a lamp-holder recess 17 sized to receive the radial inner wall 44. The radial inner wall 44 is biased radially inward. The flexible joint 37 extends between and interconnects the radial outer wall 13 and the radial inner wall 44. The flexible joint 37 is arranged to pivot the radial inner wall 44 radially outward toward the radial outer wall 13 in response to an axial force being applied to the radial inner wall 44.

The radial outer wall 13 and the radial inner wall 44 cooperate to define an angle 46 as shown in FIG. 5. In the illustrative embodiment the angle 46 is between about 10 degrees and about 15 degrees.

The radial outer wall 13 includes an attachment end 31 coupled to the mating wall 18 and a free end 33 spaced apart from the attachment end 31 as shown in FIG. 5. In the illustrative embodiment, the radial outer wall 13 is coupled to the mating wall 18 by a spacer block 34. The spacer block 34 is shaped to at least define partially the lamp-holder recess 17 between the radial outer wall 13 and the radial inner wall 44. Illustratively, the radial inner wall 44 includes a curved surface 50 that extends axially into the radial inner wall 44.

The return flange 15 includes an attachment end 35 coupled to the mating wall 18 and a free end 33 spaced apart from the attachment end 35 as shown in FIG. 5. The return flange 15 is flexible such that the free end 33 can pivot around the attachment end 35. The mating wall 18 and the return flange 15 cooperate to define a return-flange recess 16 arranged to receive the return flange 15 when the free end 33 pivots about the attachment end 35. The return flange 15 is biased axially forward. While the return flange 15 is shown as extending radially outward, in some embodiments the return flange 15 extends radially inward.

Figures 6, 7:
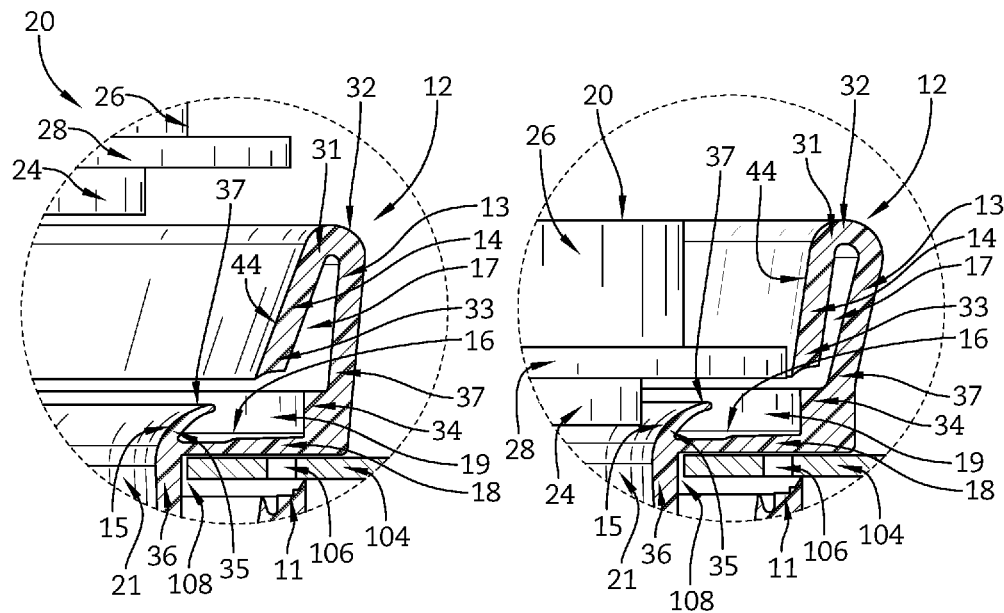
FIGS. 6-9 are a series of views showing an indicator lamp being received and retained by the lamp-mount grommet.

The indicator lamp 20 is inserted into the lamp-mount grommet 12 in a direction toward the rear of the trailer 100 as suggested in FIG. 4. In the illustrative embodiment, the lamp holder 14 is annular and the attachment end 31 has a larger diameter than a diameter of the free end 33 such that the lamp holder 14 is sloped as shown in FIG. 6. In some embodiments, the lamp holder 14 is angled from about 10 degrees to about 15 degrees relative to the axial direction. The rim 28 of the indicator lamp 20 also has a larger diameter then the diameter of the free end 33. As the indicator lamp 20 is inserted into the lamp-mount grommet 12, the rim 28 rides along the lamp holder 14 and pivots the radial inner wall 44 of the lamp holder 14 about the flexible joint 32 as suggested in FIG. 7.

Figures 8, 9:
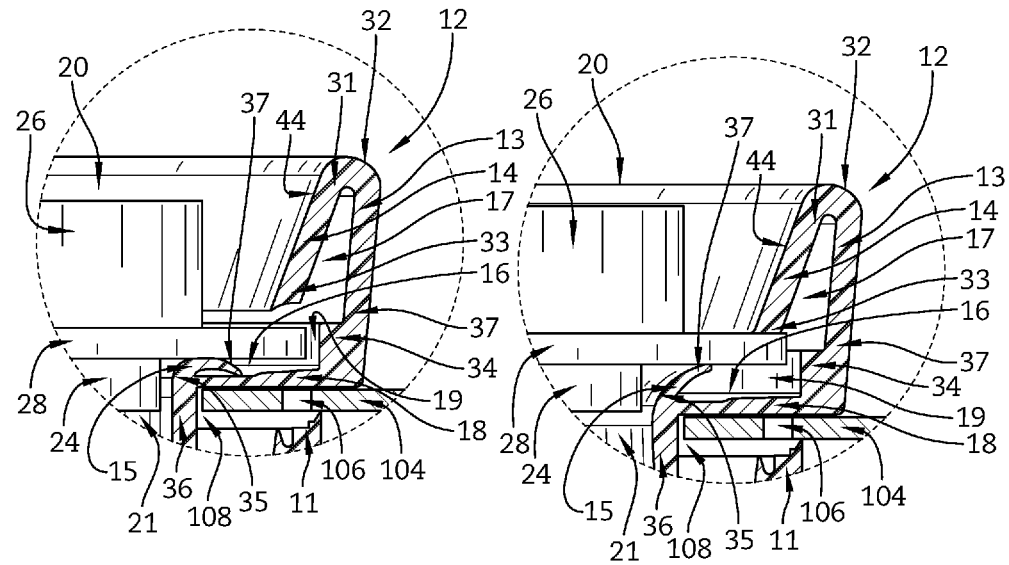

A rim receiver 19 is at least partially defined between the spacer block 34 and mating wall 18 as shown in FIG. 8. The indicator lamp 20 is inserted into the lamp-mount grommet 12 to a fully inserted position where the rim 28 is positioned in the rim receiver 19 as shown in FIG. 8. The rim 28 of the indicator lamp 20 engages with the return flange 15 and pivots the free end 33 about the attachment end 35 such that the return flange 15 is positioned in the return-flange recess 16. In the illustrative embodiment, the bezel 24 at least partially extends into the aperture 21 when the indicator lamp 20 is in the fully inserted position. The lamp holder 14 springs back radially inward as the rim 28 of the indicator lamp 20 passes the free end 33 of the lamp holder 14.

The return flange 15 engages the rim 28 to bias the indicator lamp 20 toward the lamp holder 14 and into a secured position as shown in FIG. 9. The rim 28 is trapped between the return flange 15 and lamp holder 14 to retain the indicator lamp 20 on the lamp-mount grommet 12. The free end 33 is formed to include the curved surface 50 which flattens against the rim 28 as the return flange 15 forces the indicator lamp 20 towards the lamp holder 14 as suggested in FIGS. 8 and 9. In some embodiments, the return flange 15 and lamp holder 14 form seals with the rim 28 of the indicator lamp 20.

Figure 10:
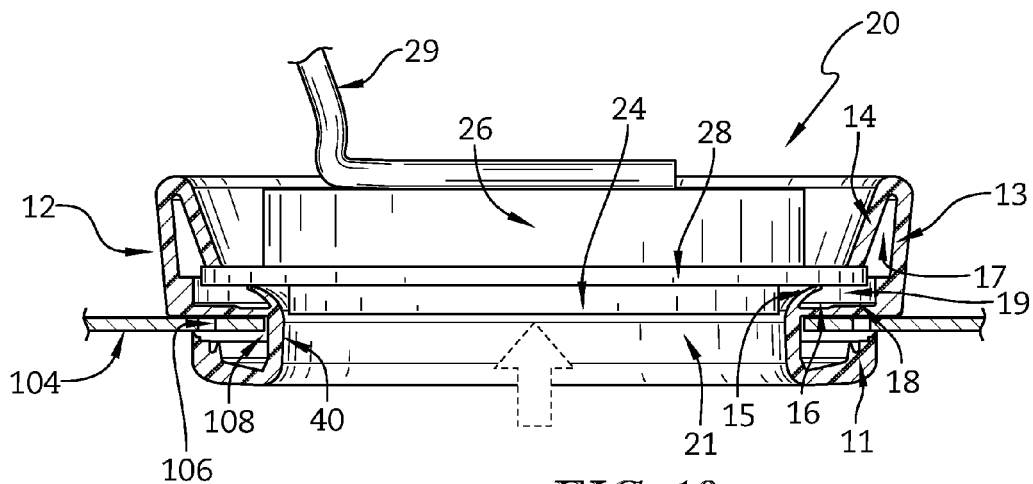
FIG. 10 is a view similar to FIG. 3 showing the indicator lamp in the secured position prior to receiving an axial force.
Figure 11:
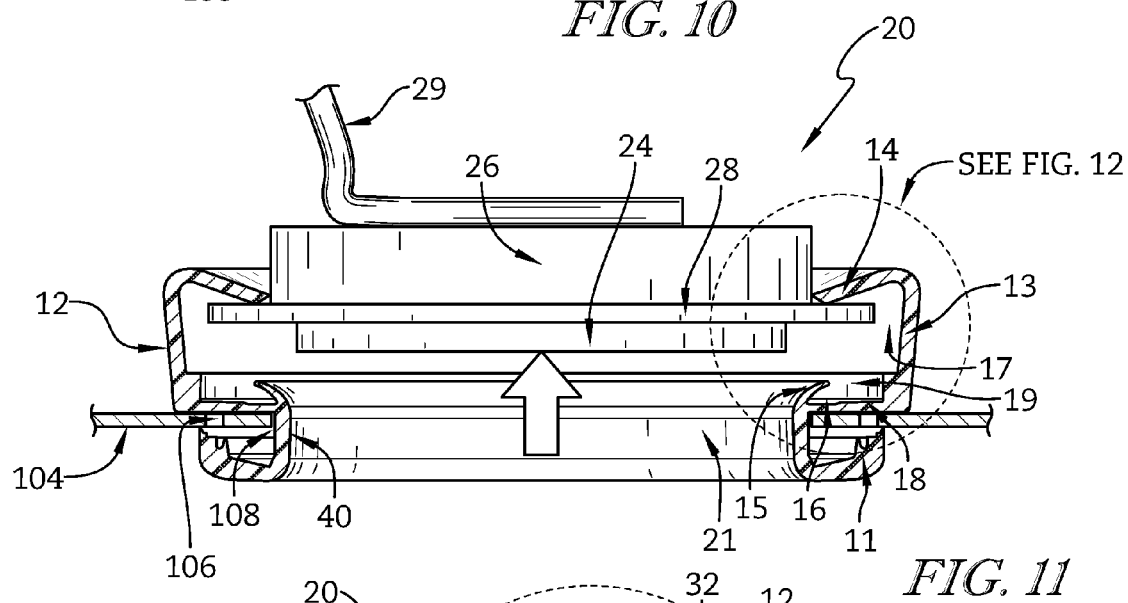
FIG. 11 is a view similar to FIG. 10 showing that the indicator lamp has moved forward in response an axial force being applied to the indicator lamp in an attempt to separate the indicator lamp from the grommet and suggesting that the lamp-mount grommet retains the indicator lamp against the axial force.
Figure 12:
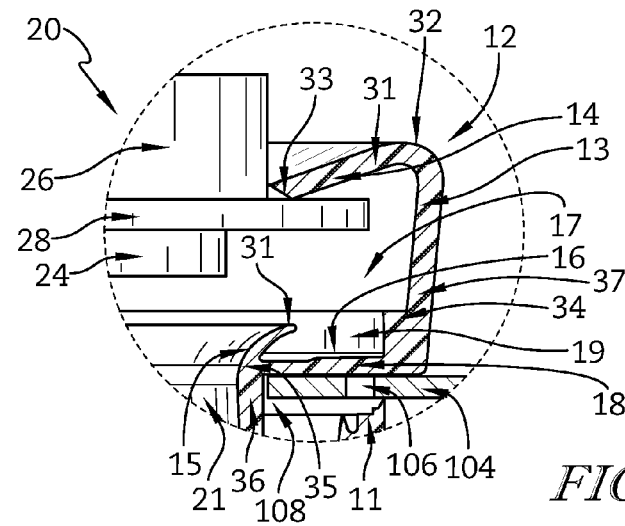
FIG. 12 is a detail view of the lamp-mount grommet of FIG. 11 showing the lamp holder in a flexed position and suggesting that the free end of the lamp holder rides along the rim of the indicator lamp to allow the indicator lamp to move in response to axial forces while retaining the indicator lamp.

The lamp-mount grommet 12 resists axial forces acting on the indicator lamp 20 as suggested in FIGS. 10-12. In FIG. 10, the indicator lamp 20 is shown in the secured position before an axially forward force is applied to the indicator lamp 20. Such forces may be due to weather or objects striking the lamp, among other possible sources. The indicator lamp 20 moves axially forward when force is applied as suggested in FIG. 11. The indicator lamp 20 can move a distance substantially equal to a length of the radial outer wall 13 and still be retained by the lamp-mount grommet 12. In one example, the indicator lamp 20 can move axially by about 1 inch relative to the mating wall 18. If the lamp 20 is pushed out of the grommet 12, the lamp falls in the lamp cavity 215 is supported by a base plate 218 of the sill 210 or by the cover 212. A user may reach into the lamp cavity 215 through the cover 212 to re-insert the lamp 20 into the grommet 12.

The lamp holder 14 pivots about the flexible joint 32 to allow the indicator lamp to move as suggested in FIG. 12. The free end 33 of the lamp holder 14 engages with the lamp body 26 of the indicator lamp 20 to limit axial movement of the indicator lamp 20. In some embodiments, the radial outer wall 13 also pivots radially outward about the flexible joint 37 during axial movement of the indicator lamp 20.

To remove the indicator lamp 20 from the lamp-mount grommet 12, a user forces lamp holder 14 into the lamp-holder recess 17 such that the free end 33 is clear of the rim 28 of the indicator lamp 20. The user then moves the indicator lamp 20 axially forward and out of the lamp-mount grommet 12. The indicator lamp 20 is then re-installed as detailed above.

In illustrative embodiments, the lamp holder (sometimes called a latching flange) is over 2 times longer than its width and has a relative angle to the indicator lamp rim. The angle of the lamp holder is gradual (about 10 to 15 degrees) that lets the lamp holder flex outward as the indicator lamp rim slides by. A flex point is created at the intersection of the spacer block (sometimes called a lamp stop) and the perimeter wall (sometimes called a supporting flange) that allows the system to flex radially outward relative to the thick spacer block when the indicator lamp is being pushed past the lamp holder. A lamp-holder recess (sometimes called a latch pocket) allows the lamp holder to nest out of the way while the indicator lamp rim passes by the lamp holder. This also allows the indicator lamp to stay engaged in the grommet even when pushed in by as much as 1 inch relative to the rear frame assembly.

In illustrative embodiments, the return flange (sometimes called a push-back flange) allows the indicator lamp to be pushed past the lamp holder (sometimes called a latching flange) by deflecting the return flange as force is applied to the indicator lamp. The return flange then pushes the indicator lamp back when released to cause the lamp holder to engage fully and deeper. This allows various indicator lamp rim thicknesses to be used successfully. The return-flange recess (sometimes called a pocket) allows the return flange to compress out of the way giving the indicator lamp rim clearance to allow latching to take place. The return flange pushes the indicator lamp back after latching. An attachment flange (sometimes called an outer flange) engages with the rear frame assembly to hold the grommet on the rear frame assembly and is sized to surround optional lamp mounting holes.

In one illustrative method, the indicator lamp is installed into the grommet by centering the lamp with the front of the grommet, pushing the lamp into the grommet such that the lamp holder deflects radially outward, pushing the lamp deeper into the grommet to pass the lamp holder and deflect the return flange, and releasing the lamp once the lamp holder springs back into place to allow the return flange to bias the lamp toward the lamp holder in a snug fit.

Figure 13:
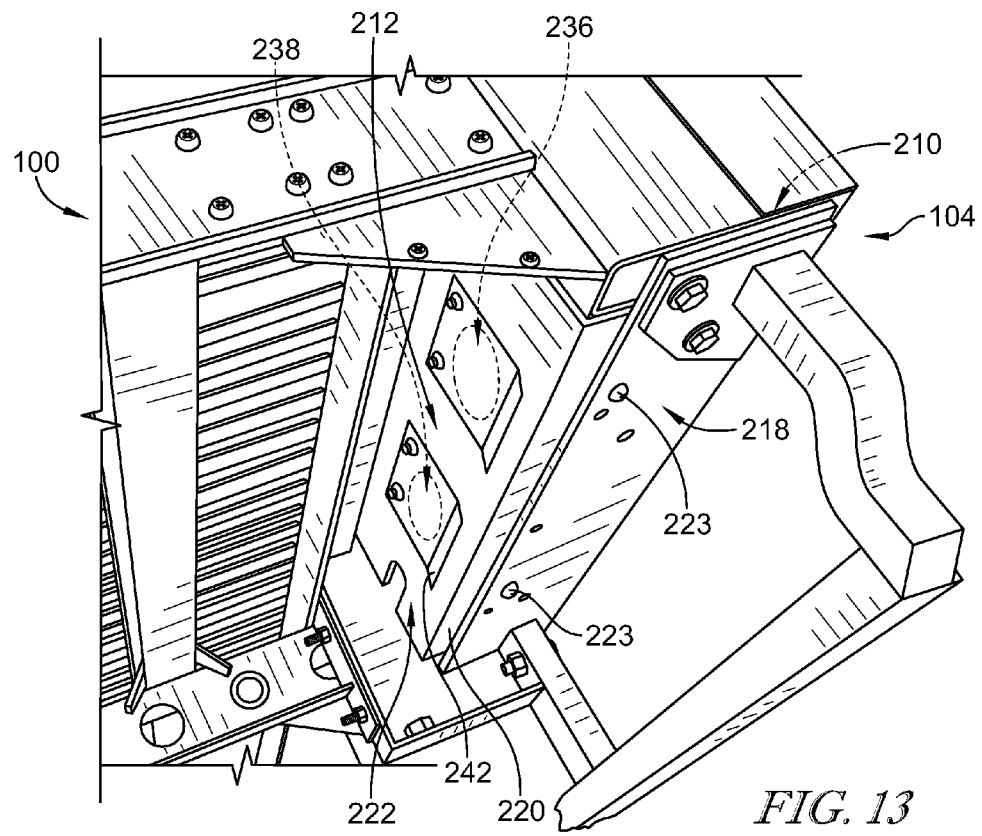
FIG. 13 is a perspective view of the rear frame assembly of FIG. 1 showing the lamp system coupled to a sill included in the semi-trailer and that the lamp system further includes a theft-deterrent plate coupled to the sill to block removal of the lamps from the lamp system to deter theft.

In the illustrative embodiment, the theft-deterrent cover 212 and the signal assembly 105 are coupled to a sill 210 of the rear frame assembly 104 as shown in FIG. 13. The sill 210 extends along a width of the rear of the trailer 100. The signal assembly 105 is coupled to the sill 210 and extends part-way through the sill 210. The theft-deterrent cover 212 is coupled to the sill 210 to close the forwardly opening lamp cavity 215 configured to locate a portion of the lamp-mount grommet 12 of the signal assembly 105 therein to block the signal assembly 105 from being removed from the lamp cavity 215.

Figure 14:
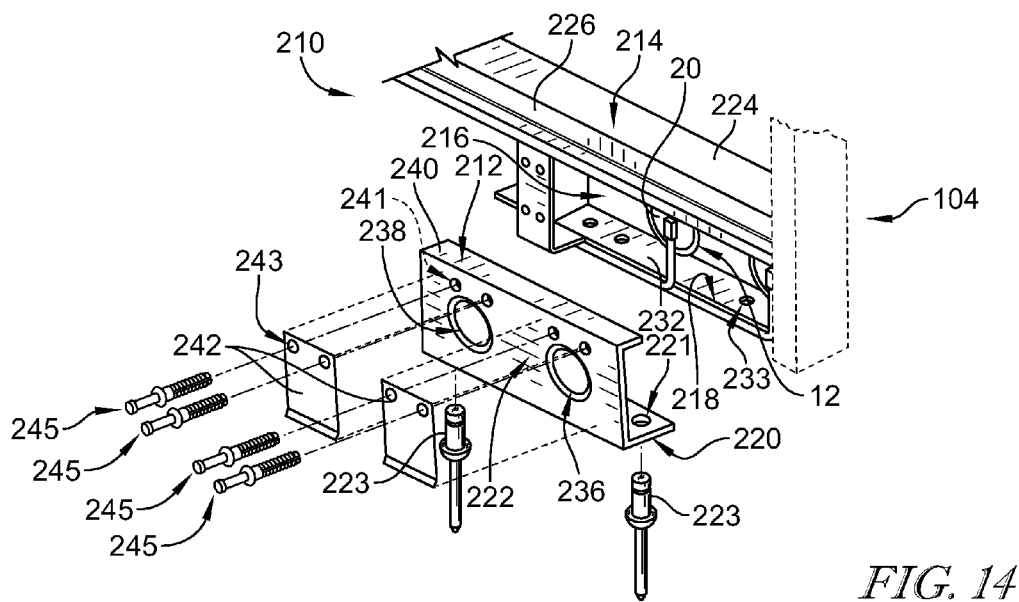
FIG. 14 is an exploded assembly view of the theft-deterrent plate and the rear frame assembly of FIG. 13.

The sill 210 includes an upper support wall 214, a fantail 216, and a base plate 218 as shown in FIGS. 13-15. Illustratively, the upper support wall 214 is coupled to a floor of the trailer 100. The fantail 216 extends downwardly away from the upper support wall 214 toward the base plate 218 and is formed to locate the lamp-mount grommet 12 therein. The base plate 218 is coupled to a bottom edge of the fantail 216 and is generally perpendicular to the fantail 216.

The theft-deterrent cover 212 includes a sill mount 220 and an access panel 222 as shown in FIGS. 13-15. The sill mount 220 couples the theft-deterrent cover 212 with the base plate 218. The access panel 222 is arranged to extend upwardly away from the sill mount 220. The access panel 222 is generally perpendicular to the sill mount 220 and is generally parallel to the fantail 216. The access panel 222 cooperates with the fantail 216 to locate the lamp holder 14 therebetween as shown in FIG. 15.

The upper support wall 214 of the sill 210 includes a top band 224 and a retainer flange 226 as shown in FIG. 15. The top band 224 extends between and interconnects the retainer flange 226 and the fantail 216. In the illustrative embodiment, the top band 224 is generally horizontal relative to ground. The retainer flange 226 is illustratively S-shaped and extends downwardly towards the base plate 218 and a forwardly away from the top band 224. The retainer flange 226 cooperates with the top band 224 and an upper portion of the fantail 216 to form a panel-receiving cavity 228. In the illustrative embodiment, the upper support wall 214 couples to the floor of the trailer 100.

The fantail 216 of the sill 210 extends downwardly away from the top band 224 and, in the illustrative embodiment, is generally perpendicular with the top band 224 as shown in FIG. 15. The fantail 216 cooperates with the retainer flange 226 to locate a portion of the access panel 222 in the panel-receiving cavity 228. The fantail 216 is formed to include the grommet-receiving aperture 108 to locate the grommet 12 therein as shown in FIG. 14. Locating the portion of the access panel 222 in the panel-receiving cavity 228 minimizes access to the lamp cavity 215 until the theft-deterrent cover 212 is removed.

The base plate 218 is coupled to a bottom edge of the fantail 216 as shown in FIGS. 13 and 15. Illustratively, the base plate 218 is generally perpendicular to the fantail 216 and generally parallel to the top band 224 of the upper support wall 214. The base plate 218 includes a ledge 230, a cover mount 232, and a fantail mount 234. The ledge 230 extends rearward away from the fantail mount 234. The cover mount 232 is configured to couple to the access panel 222. The fantail mount 234 extends between and interconnects the ledge 230 and the cover mount 232 and couples the base plate 218 to the fantail 216.

The cover mount 232 extends away from the fantail 216 toward the access panel 222 to underlie the top band 224 as shown in FIG. 15. The cover mount 232 is formed to include at least one first-fastener aperture 233. The cover mount 232 cooperates with the fantail 216, the access panel 222, and the upper support wall 214 to define the lamp cavity 215 therebetween as shown in FIG. 15.

The theft-deterrent cover 212 is coupled with the base plate 218 by at least one fastener 223 as shown in FIGS. 13-15. In the illustrative embodiment, the fasteners 223 comprise pull rivets (sometimes called monobolts). The pull rivets 223 are shown before they have been set in FIG. 14 and shown after they are set in FIG. 15 to couple the cover 212 with the base plate 218. In other embodiments, the fasteners 223 comprise drive rivets or other suitable alternatives. As such, it may be difficult for a potential thief to steal the lamps 20, for example, without the assistance of a tool such as a drill, hammer, or grinder.

The theft-deterrent cover 212 includes the sill mount 220 and the access panel 222 as shown in FIGS. 13-15. The sill mount 220 couples the theft-deterrent cover 212 to the cover mount 232 of the base plate 218 as shown in FIG. 15. The sill mount 220 lies adjacent to the cover mount 232 to be located between the base plate 218 and the top band 224 and define a portion of the lamp cavity 215. The sill mount 220 is formed to include fastener apertures 221. The fastener apertures 221 cooperate with the fastener apertures 233 of the cover mount 232 to locate the fasteners therethrough.

The access panel 222 extends upwardly away from the sill mount 220 towards the upper support wall 214 as shown in FIGS. 13-15. In the illustrative embodiment, the theft-deterrent cover 212 further includes a top segment 240 located along a top edge of the access panel 222. The top segment 240 extends rearward away from the access panel 222 into the panel-receiving cavity 228 as shown in FIG. 15. In some embodiments, a portion of the access panel 222 and the top segment 240 are located between the retainer flange 226 and the fantail 216 as shown in FIG. 15. The retainer flange 226 overlaps the top edge of the access panel 222 to block movement of the top edge of the access panel 222 and, thus, limits access into the lamp cavity 215.

In the illustrative embodiment, the access panel 222 is formed to include a first-access aperture 236 and a second-access aperture 238 as shown in FIGS. 13-15. Each of the first-access aperture 236 and the second-access aperture 238 is sized to prevent removal of the indicator lamp 20 from the lamp cavity 215 through the apertures 236, 238. As an example, the first-access aperture 236 is formed to include a diameter that is smaller than a diameter of the indicator lamp 20. As such, the lamp 20 is blocked from escaping the lamp cavity 215 through the first access aperture 236. In some embodiments, the access aperture 236 has a diameter between about three inches and about six inches. In some embodiments, the access aperture 236 has a diameter between about four inches and about six inches. In some embodiments, the access aperture 236 has a diameter between about four inches and about five inches. In the illustrative embodiment, the first-access aperture 236 has about a four-inch diameter. In the illustrative embodiment, the lamp 20 has a diameter of between about five inches and about five and a half inches. In some embodiments, the access panel 222 includes only the first-access aperture 236.

The access aperture 236 allows a user to reinsert the lamp 20 into the grommet 12 if the lamp 20 gets pushed through the grommet 12 and falls into the lamp cavity 215. The access aperture 236 allows the user access to the lamp to do lamp trouble shooting such as, for example, testing a connection or switching an electrical connection with another lamp in the enclosure. The access aperture 236 is small than a diameter of the lamp 20. As such, in the illustrative embodiment, the cover 212 needs to be removed by removing fasteners to remove the lamp 20 from the lamp cavity 215.

In the illustrative embodiment, the apertures 236, 238 are spaced apart from one another as shown in FIGS. 13 and 14. A user may place their hand through one aperture 236, 238 while looking through the other aperture 236, 238 to see into the lamp cavity 215 while they re-mount an indicator lamp 20. In the illustrative embodiment, the apertures 236, 238 are tapered as shown in FIG. 14.

In some embodiments, the access panel 222 further includes a splash guard 242 as shown in FIGS. 13 and 15. The splash guard 242 is arranged to overlie the access apertures 236, 238 and prevent unwanted dirt, water, debris, etc. from entering the lamp cavity 215. Illustratively, each splash guard 242 is coupled to the access panel 222 with fasteners 245 such as, for example, screws, bolts, pull rivets, and drive rivets that extend through apertures 243 formed in the splash guard 242 and apertures 241 formed in the panel 212. In other embodiments, the splash guards 242 are coupled to the access panel 222 with adhesive. In an embodiment, the splash guard 242 comprises rubber. The splash guard 242 is arranged to cover the aperture 236 to selectively bock access into the lamp cavity 215.

The lamp assemblies 10 are mounted with the fantail 216 while the cover 212 is separated from the rear frame assembly 104. The cover 212 is then coupled to the base plate 218 with fasteners 223. The lamp-mount grommet 12 blocks a potential thief from removing the indicator lamp 20 through the rear end of the rear frame assembly 104 and the cover 212 blocks the potential thief from removing the indicator lamp 20 through the front end of the rear frame assembly 104.

A user may replace an indicator lamp 20 by removing the fasteners 223 and separating the theft-deterrent cover 212 from the rear frame assembly 104. The lamp holder 14 of the grommet 12 may be deformed outwardly and the indicator lamp 20 may be pulled forward to separate the indicator lamp 20 from the grommet 12. The indicator lamp 20 may then be pulled forward out of the lamp cavity 215 through an opening between the base plate 218 and the retainer flange 226. A new indicator lamp 20 may be installed into the grommet 12 and the cover 212 may be re-mounted to the rear frame assembly 104.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A vehicle assembly for deterring theft of a vehicle lamp, the vehicle assembly comprising:
   a sill having an upper support wall extending parallel to a longitudinal axis of a vehicle in which the vehicle assembly is installed, a generally vertically extending fantail having an upper end coupled to the upper support wall and a lower end spaced apart from the upper end, and a base plate coupled to the lower end of the fantail and extending parallel to the upper support wall, the upper support wall, the fantail, and the base plate cooperate to define a forwardly opening lamp cavity, and the fantail formed to include a grommet-receiving aperture that extends through the fantail,
   a lamp-mount grommet having a body that extends through the grommet-receiving aperture formed in the fantail to couple the lamp-mount grommet with the sill and a lamp holder that extends away from the body into the lamp cavity, the lamp holder arranged to support a lamp in the forwardly opening lamp cavity, and the lamp-mount grommet sized to prevent removal of a lamp through the grommet-receiving aperture, and
   a theft-deterrent cover coupled to the sill to close the forwardly opening lamp cavity.

2. The vehicle assembly of claim 1, wherein the theft-deterrent cover includes a generally horizontal sill mount coupled to the base plate and an access panel that extends upwardly away from the sill mount to close the forwardly opening lamp cavity, the upper support wall includes a top band coupled to the fantail and a retainer flange spaced apart from the fantail and coupled to the top band, and the retainer flange extends downwardly away from the top band toward the base plate and overlaps a portion of the access panel to block forward movement of the access panel.

3. The vehicle assembly of claim 1, wherein the theft-deterrent cover includes a generally horizontal sill mount coupled to the base plate and an access panel that extends upwardly away from the sill mount to close the forwardly opening lamp cavity, the access panel is formed to include an access aperture that extends through the access panel to limit access into the lamp cavity, and the access aperture is aligned with the grommet-receiving aperture.

4. The vehicle assembly of claim 3, wherein the theft-deterrent cover further includes a splash guard coupled to the access panel and the splash guard is arranged to cover the access aperture to selectively block access into the lamp cavity.

5. The vehicle assembly of claim 1, wherein the lamp holder of the lamp-mount grommet is arranged around a central axis of the lamp-mount grommet, the lamp holder includes a radial outer wall coupled to the body, a radial inner wall located radially between the radial outer wall and the central axis to define a lamp-holder recess between the radial inner wall and the radial outer wall, and a flexible joint that extends radially between and interconnects the radial outer and inner walls, and the flexible joint is arranged to pivot the radial inner wall radially outward toward the radial outer wall in response to an axially rearward force being applied to the radial inner wall.

6. The vehicle assembly of claim 5, wherein the radial inner wall and the radial outer wall cooperate to define an angle therebetween and the angle is between about 10 degrees and about 15 degrees.

7. A vehicle assembly comprising:
a cover including a sill mount arranged to extend generally horizontal relative to ground underlying the sill mount and an access panel coupled to the sill mount and arranged to extend upwardly away from the sill mount, the cover configured to be mounted to the sill such that the cover is inwardly facing and hidden from sight when mounted to the sill,
wherein the sill mount is formed to include a fastener aperture that extends through the sill mount and is adapted to receive a fastener to couple the sill mount to a vehicle and the access panel is formed to include an access aperture that extends through the access panel, the access aperture sized to receive a hand of a user of the theft-deterrent cover assembly.

8. The vehicle assembly of claim 7, wherein the access aperture has a diameter between about four inches and about six inches.

9. The vehicle assembly of claim 8, wherein the cover further includes a top segment spaced apart from the sill mount and coupled to the access panel and the top segment and the sill mount are generally parallel.

10. The vehicle assembly of claim 7, wherein the sill is formed to include a grommet-receiving aperture that extends through the sill, and the access aperture is aligned with the grommet-receiving aperture.

11. The vehicle assembly of claim 10, wherein the sill includes an upper support wall, a fantail having an upper end coupled to the upper support wall and a lower end spaced apart from the upper end, and a base plate coupled to the lower end of the fantail, the upper support wall, the fantail, the base plate, and the cover cooperate to define the lamp cavity, and a portion of the upper support wall extends downwardly and overlaps a portion of the access panel to block forward movement of the access panel.

12. The vehicle assembly of claim 10, wherein the cover further includes a splash guard coupled to the access panel and the splash guard is arranged to cover the access aperture to selectively block access to the lamp cavity.

13. A grommet for mating a lamp with a vehicle, the grommet comprising:
a body arranged around a central axis of the grommet, the body including an axially extending annular alignment wall having a front end and a rear end, a mating wall that extends radially outward away from the front end of the alignment wall, and an attachment flange that extends radially outward away from the rear end of the alignment wall, the alignment wall, the mating wall, and the attachment flange cooperate to define a radially outwardly opening fantail channel that extends around the central axis, and the fantail channel adapted to receive a portion of a vehicle therein to couple the grommet with the vehicle, and
a lamp holder coupled with the mating wall, the lamp holder including a radial outer wall coupled to the mating wall and arranged to extend axially forward away from the mating wall, a radial inner wall located radially between the radial outer wall and the central axis to define a lamp-holder recess between the radial inner wall and the radial outer wall, and a flexible joint that extends radially between and interconnects the radial outer and inner walls, the radial inner wall arranged to extend from the flexible joint axially rearward toward the mating wall, and the flexible joint arranged to pivot the radial inner wall radially outward toward the radial outer wall in response to a first axially rearward force being applied to the radial inner wall.

14. The grommet of claim 13, wherein the radial inner wall includes an attachment end coupled to the flexible joint and a free end spaced apart from the attachment end and the free end is spaced apart axially from the mating wall to form a gap therebetween.

15. The grommet of claim 14, wherein the free end of the radial inner wall is formed to include a curved surface that defines a channel that extends axially into the radial inner wall.

16. The grommet of claim 14, wherein the radial inner wall and the radial outer wall cooperate to define an angle therebetween and the angle is between about 10 degrees and about 15 degrees.

17. The grommet of claim 13, further comprising a return flange coupled to the mating wall, the return flange is arranged to extend axially forward away from the mating wall and radially outward toward the radial outer wall of the lamp holder, and the return flange is arranged to temporarily deform in response to a second axially rearward force being applied to the return flange.

18. The grommet of claim 17, wherein the return flange includes an attachment end coupled to the mating wall and a free end spaced apart from the attachment end and the return flange and the mating wall cooperate to define a radially outwardly opening return-flange recess therebetween.

19. The grommet of claim 13, wherein the body and the lamp holder form a monolithic component made of an elastic material.

20. The grommet of claim 13, wherein the mating wall includes a first end coupled with the alignment wall and a second end spaced apart from the first end of the mating wall, the attachment flange includes a first end coupled with the alignment wall and a second end spaced apart from the first end of the attachment flange, and the second end of the mating wall is radially spaced apart from the second end of the attachment flange to locate the second end of the attachment flange radially between the second end of the mating wall and the alignment wall.

* * * * *